United States Patent [19]
Marshall et al.

[11] Patent Number: 5,917,929
[45] Date of Patent: Jun. 29, 1999

[54] USER INTERFACE FOR COMPUTER AIDED DIAGNOSIS SYSTEM

[75] Inventors: Julian Marshall, Los Altos; Harlan M. Romsdahl, Half Moon Bay; Ewout A. Mante, Palo Alto, all of Calif.

[73] Assignee: R2 Technology, Inc., Los Altos, Calif.

[21] Appl. No.: 08/685,292

[22] Filed: Jul. 23, 1996

[51] Int. Cl.$^6$ .................................................. G06K 9/00
[52] U.S. Cl. ............................. 382/128; 348/96; 378/29; 382/132
[58] Field of Search ................................. 382/128, 132; 128/660.08; 378/37, 98.9, 21, 28, 29, 62, 63; 348/96–99, 100, 102, 103, 105, 107, 110, 112; 396/284, 515

[56] References Cited

U.S. PATENT DOCUMENTS

| | | | |
|---|---|---|---|
| 4,794,531 | 12/1988 | Morishita | 382/132 |
| 4,839,807 | 6/1989 | Doi et al. | 382/128 |
| 4,839,822 | 6/1989 | Dormond et al. | 128/630 |
| 4,841,555 | 6/1989 | Doi et al. | 378/98.4 |
| 4,851,984 | 7/1989 | Doi et al. | 382/108 |
| 4,856,528 | 8/1989 | Yang et al. | 382/108 |
| 4,875,165 | 10/1989 | Fencil et al. | 395/124 |
| 4,907,156 | 3/1990 | Doi et al. | 382/130 |
| 4,918,534 | 4/1990 | Lam et al. | 348/367 |
| 4,945,476 | 7/1990 | Bodick et al. | 128/630 |
| 4,998,270 | 3/1991 | Scheid et al. | 378/155 |
| 4,999,497 | 3/1991 | Funahashi et al. | 250/587 |
| 5,003,571 | 3/1991 | Kido et al. | 378/98.11 |
| 5,019,975 | 5/1991 | Mukai | 364/413.13 |
| 5,072,384 | 12/1991 | Doi et al. | 382/132 |
| 5,078,142 | 1/1992 | Siczek et al. | 128/653.1 |
| 5,079,698 | 1/1992 | Grenier et al. | 382/128 |
| 5,123,054 | 6/1992 | Hara et al. | 382/130 |
| 5,142,557 | 8/1992 | Toker et al. | 378/37 |
| 5,172,418 | 12/1992 | Ito et al. | 382/132 |
| 5,172,419 | 12/1992 | Manian | 382/132 |
| 5,198,669 | 3/1993 | Namiki et al. | 250/587 |
| 5,212,637 | 5/1993 | Saxena | 128/653.1 |
| 5,224,036 | 6/1993 | Ito et al. | 382/132 |
| 5,227,969 | 7/1993 | Waggener et al. | 128/653.1 |
| 5,235,510 | 8/1993 | Yamada et al. | 364/413.02 |
| 5,245,539 | 9/1993 | Romeas et al. | 382/132 |
| 5,260,871 | 11/1993 | Goldberg | 128/660.06 |
| 5,289,374 | 2/1994 | Doi et al. | 128/653.1 |
| 5,297,036 | 3/1994 | Grimaud | 382/132 |
| 5,319,549 | 6/1994 | Katsuragawa et al. | 382/108 |
| 5,331,550 | 7/1994 | Stafford et al. | 382/128 |
| 5,343,390 | 8/1994 | Doi et al. | 382/132 |
| 5,347,563 | 9/1994 | Heidsieck | 378/62 |
| 5,347,594 | 9/1994 | Grimaud | 382/207 |
| 5,359,513 | 10/1994 | Kano et al. | 382/128 |
| 5,384,643 | 1/1995 | Inga et al. | 358/403 |
| 5,384,862 | 1/1995 | Echerer et al. | 382/132 |
| 5,398,684 | 3/1995 | Hardy | 128/653.1 |
| 5,410,144 | 4/1995 | Lavelle et al. | 250/208.1 |
| 5,412,763 | 5/1995 | Knoplioch et al. | 395/124 |
| 5,416,602 | 5/1995 | Inga et al. | 358/403 |

(List continued on next page.)

FOREIGN PATENT DOCUMENTS

94307124 9/1994 European Pat. Off. .

*Primary Examiner*—Jon Chang
*Assistant Examiner*—Jayanti K. Patel
*Attorney, Agent, or Firm*—Pennie & Edmonds LLP

[57] ABSTRACT

A user interface for facilitating the input of films into a computer-aided diagnosis system is disclosed. The user interface includes a scanner which receives and scans the film-based images, and a film feeder which holds and transports them to the scanner. A touch sensitive display screen is provided to display status information to and receive instructions from an operator. The display screen displays miniature images of the films having color-coded borders so that the operator monitors the processing of the films. The interface also includes a bar code reader and allow the operator to conduct procedures for testing the scanner.

33 Claims, 8 Drawing Sheets

U.S. PATENT DOCUMENTS

| | | | |
|---|---|---|---|
| 5,426,582 | 6/1995 | Bossaert et al. | 382/274 |
| 5,428,690 | 6/1995 | Bacus et al. | 382/128 |
| 5,430,810 | 7/1995 | Saeki | 382/281 |
| 5,432,871 | 7/1995 | Novik | 382/232 |
| 5,452,367 | 9/1995 | Bick et al. | 382/128 |
| 5,452,416 | 9/1995 | Hilton et al. | 395/346 |
| 5,465,718 | 11/1995 | Hochman et al. | 128/653.1 |
| 5,467,153 | 11/1995 | Fargot | 353/103 |
| 5,515,450 | 5/1996 | Takeo et al. | 382/132 |
| 5,526,394 | 6/1996 | Siczek et al. | 378/37 |
| 5,537,485 | 7/1996 | Nishikawa et al. | 382/130 |
| 5,544,650 | 8/1996 | Boon et al. | 128/632 |
| 5,555,042 | 9/1996 | Jones et al. | 348/110 |
| 5,572,565 | 11/1996 | Abdel-Mottaleb | 378/37 |
| 5,579,360 | 11/1996 | Abdel-Mottaleb | 378/37 |
| 5,598,481 | 1/1997 | Nishikawa et al. | 382/130 |
| 5,627,908 | 5/1997 | Lee et al. | 382/133 |
| 5,671,288 | 9/1997 | Wilhelm et al. | 382/128 |
| 5,729,620 | 3/1998 | Wang | 382/128 |

FIG.8

USER INTERFACE FOR COMPUTER AIDED DIAGNOSIS SYSTEM

BACKGROUND OF THE INVENTION

1. Field of the Invention

The present invention relates to the field of computer-aided detection of abnormalities found in medical images. In particular, the invention relates to a user interface for facilitating input of film-based medical images into computer-aided diagnosis systems that detect abnormalities in such images.

2. Description for the Related Art

Various systems and methods are currently known for computerized detection of abnormalities in radiographic images, such as those disclosed by Giger et al. in RadioGraphics, May 1993, pp. 647–656; Giger et al. in Proceedings of SPIE, Vol. 1445 (1991), pp. 101–103; U.S. Pat. No. 4,907,156 to Doi et al.; U.S. Pat. No. 5,133,020 to Giger et al.; U.S. Pat. No. 5,343,390 to Doi et al.; U.S. Pat. No. 5,491,627 to Zhang et al. These references are incorporated herein by reference as though fully set forth herein. These systems are generally referred to as Computer-Aided Diagnosis systems, Computer-Aided Detection systems, or simply, CAD systems. Such systems are believed to be particularly useful to radiologists and other medical specialists in diagnostic processes and specifically in radiologic screening procedures.

In a radiologic screening procedure, such as screening mammography, true abnormalities such as cancers are believed to occur at a typical rate of about one case per one hundred patient examinations. It is believed a CAD system, serving as an electronic reminder or second reader, can assist radiologists in obtaining higher detection rates, or higher sensitivity for abnormalities. Additionally, such CAD systems can assist radiologists in reducing the misdiagnosis rate, or lowering the false negative rate. Thus, it is believed that the use of such CAD systems will continue to increase.

Since such CAD systems typically operate on medical images in high-resolution digital format, film-based medical images ordinarily must be scanned by a high resolution scanner to convert the image data into digital form. With current CAD systems, however, we have found that systems for loading and feeding film-based medical images to the scanner are inadequate, in that they tend to require too much time and effort from the operator. Additionally, we have found that currently available systems do not allow the operator to simply and conveniently enter case information, monitor the status of cases, and abort or adjust the processing of films being processed. For example, with currently available systems, errors in film orientation may not be detected until the radiologist views the analyzed image.

SUMMARY OF THE INVENTION

Thus, the expected increase in use of CAD systems has spawned a great need to provide a simple, convenient and user-friendly interface between a CAD system and an operator who controls, loads, and monitors the status of the films during processing.

Accordingly, the present invention is directed to a user interface for facilitating input of data from medical images into a computer-aided diagnosis system for detecting anatomical abnormalities in the medical images. The user interface receives image data from a source such as a digital medical imaging system, digital image storage system, or a scanner which receives and scans the film-based medical images and generates the digital image data. According to a preferred embodiment, a film feeder is mechanically connected to the scanner and holds one or more film-based medical images. The film feeder also transports the film-based medical images to the scanner. A display is coupled with the computer-aided diagnosis system and displays status information to a user who loads the film-based medical images in the film feeder. The user interface also includes a system by which the user can enter information into the computer-aided diagnosis system.

According to a preferred embodiment of the invention, the user interface also displays status information which indicates when the scanned film-based medical image was incorrectly loaded into the film feeder. The film feeder may be of a slotted type, stack feeding type, or some other type. Additionally, the user is able to instruct the computer-aided diagnosis system to organize the digital image data to compensate for errors in loading the film feeder.

Also according to a preferred embodiment of the invention, miniature images showing features of scanned film-based medical images are displayed in such a way that errors in loading the film-based medical images are indicated to the user. Further, a color-coded border surrounding each miniature image may be displayed to indicate to the user the current processing status of that image.

According to a further preferred embodiment, a touch-sensitive panel is overlaid on a display screen. By using the touch-sensitive panel, the user indicates to the computer-aided diagnosis system which image views will be loaded into the film feeder. The touch-sensitive panel is also used to control other CAD system functions such as selection of user options, self-test, diagnostics, quality control and assurance procedures, system maintenance functions, error reporting, and data archiving. The touch-sensitive panel or a keyboard may be used to enter patient information. A bar code reader may be provided to scan bar coded information identifying the film-based medical images and may access patient information from a database of the institution operating the computer-aided diagnosis system. The touch-sensitive panel and the bar code reader may also be used to give commands to the system in the absence of a keyboard. Quality assurance procedures are also provided to allow the user to test the scanner.

DETAILED DESCRIPTION OF THE INVENTION

It has been found that the currently available CAD systems are lacking in their ability to facilitate the loading and feeding of films for processing. In particular, it has been found that providing a film feeding mechanism which holds multiple films and automatically feeds the films to the scanner greatly reduces the time and labor required to load and input films into the system. Such feeding mechanisms may be provided in either a slotted film holder which holds the films for a given case, or a stack film feeder that holds a relatively large number of films.

In providing the capability for feeding multiple films, it has been discovered there is an increased likelihood that some films are incorrectly loaded in the feeding mechanism. For example, a film may be incorrectly oriented in the feeder, or films may be arranged in the wrong order. Although such films may be analyzed correctly by the CAD system, they will undesirably be displayed to the radiologist in the wrong orientation or order.

Thus, it has been found that providing feedback to the operator during the early stages of processing advantageously allows the operator to correct loading errors during those early stages. In particular, it has been found that alerting the operator, as soon as the films are scanned, that the there has been some error in the loading of the films provides great savings in both time and expense needed to operate the CAD system.

Importantly, it has been discovered that alerting the operator to problems in loading during the early stages of processing provides the unexpected result of training the operator to load films correctly. It is believed that indicating a problem in loading to the operator as soon as the film has been scanned, provides crucial feedback to the operator so that incorrect loading is discouraged and correct loading is encouraged.

Figure 1:
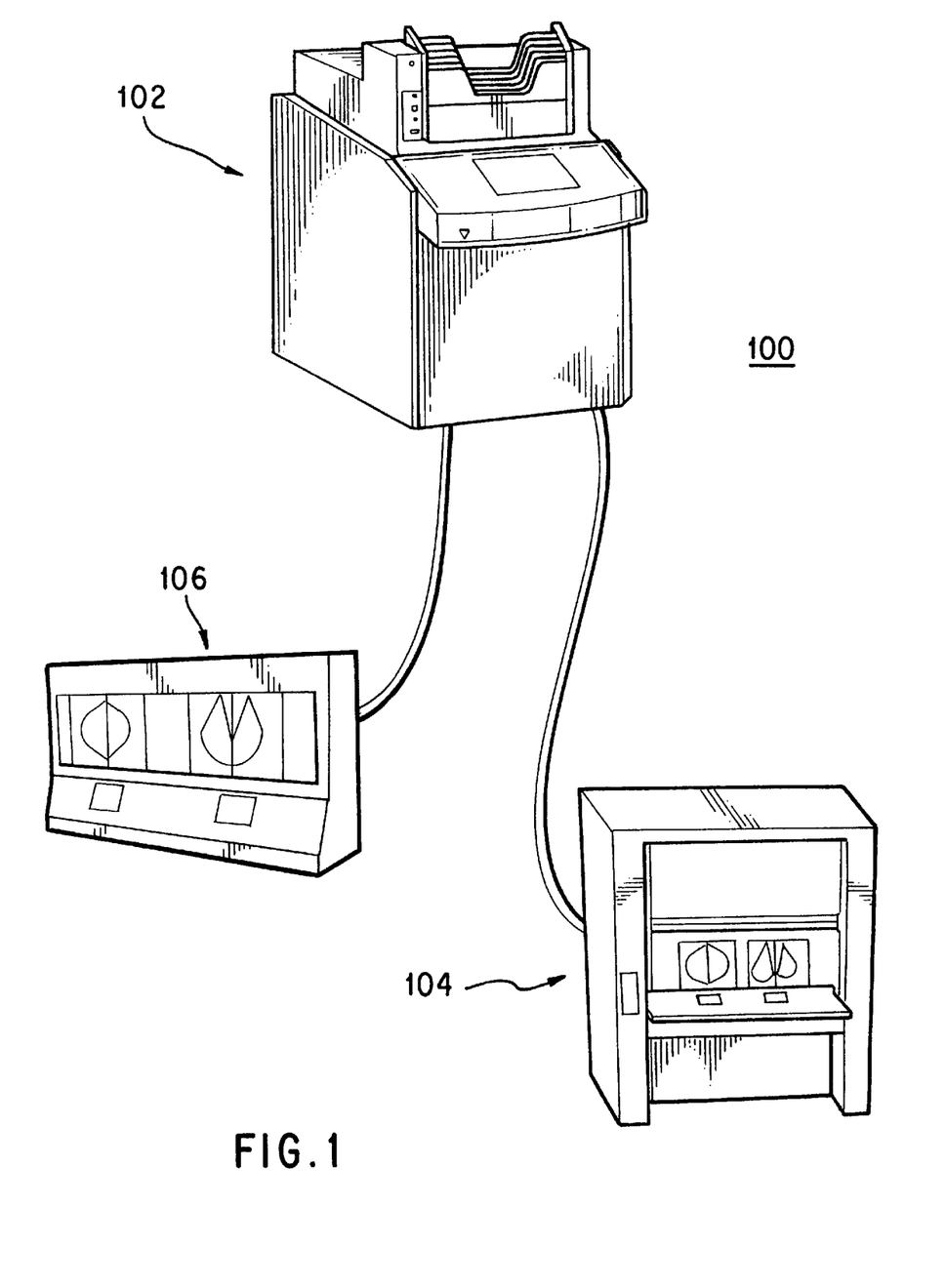
FIG. 1 illustrates an example of a computer-aided diagnostic system according to the invention.

According to a preferred embodiment of the invention, a system for the detection of breast carcinoma is illustrated in FIG. 1. As shown, detection system 100 comprises a processor housing 102, a motorized viewer 104, and a wet read viewer 106. According to this embodiment, mammography x-ray films are loaded, scanned and analyzed by a processor unit in processor housing 102. After the x-ray films are analyzed by processor housing 102, data representing regions of interest identified by the processor unit are transmitted for display to one or more viewers. In the example shown in FIG. 1, the data may be sent to motorized viewer 104, wet read viewer 106, or both.

Note that although these preferred embodiments are described with respect to detection system 100 which processes and analyzes mammography x-ray films, the present invention is readily adaptable to many other types of CAD systems. Additionally, the present invention is applicable to CAD systems which analyze other kinds of images besides x-ray films. The invention is applicable to CAD systems which process any type of film-based medical images. For example, ultrasound imaging, nuclear magnetic resonance imaging, computed tomography imaging, and scintillation camera imaging may all produce images which are film-based. Additionally, a film-based medical image may be carried on a wide variety of film-like materials such as vellum, or any other transparent or translucent media.

Figure 2:
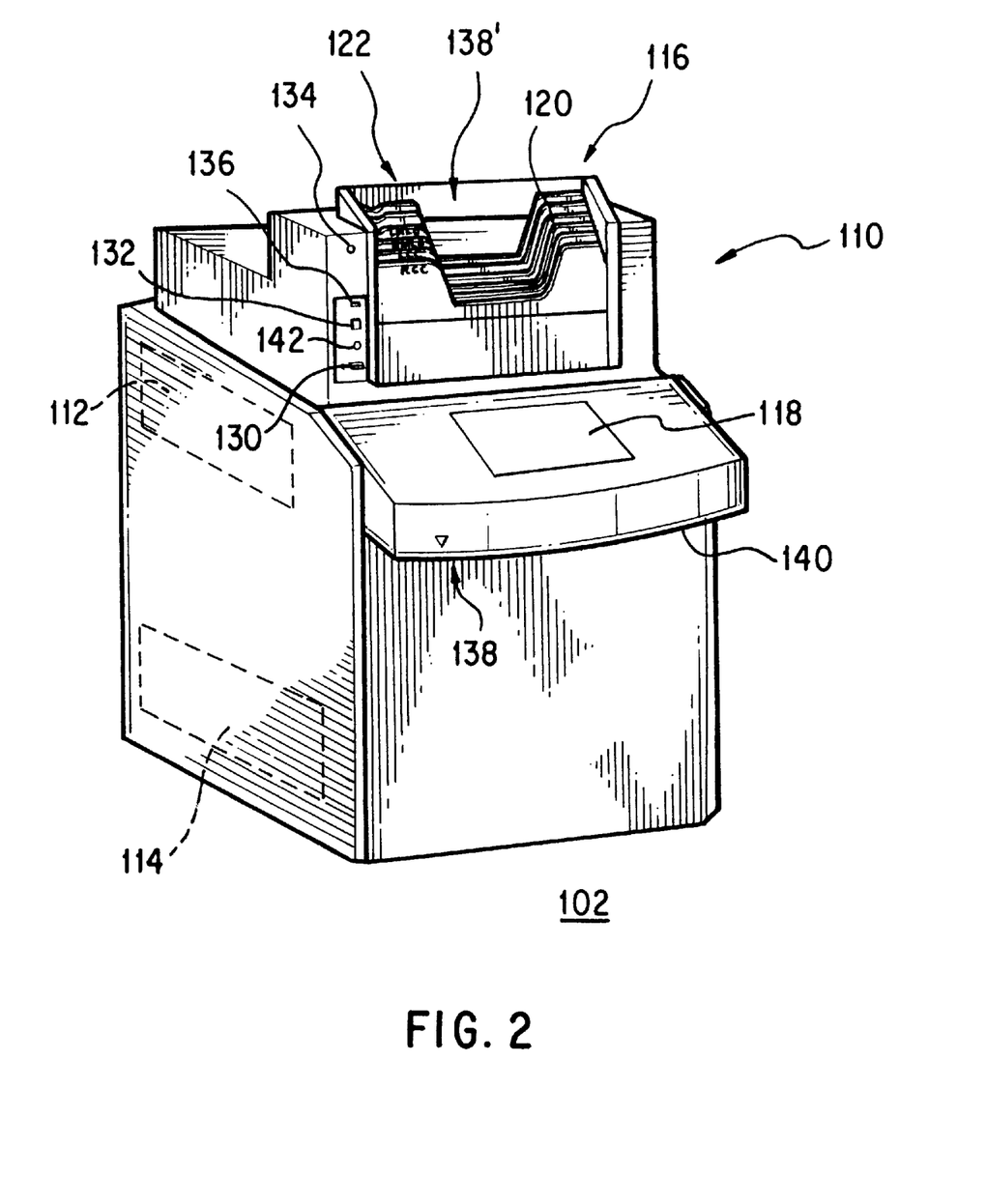
FIG. 2 illustrates an example of a processor housing for a computer-aided diagnostic system which includes a user interface, according to the invention.

Referring now to FIG. 2, the components in processor housing 102 will now be described in greater detail according to a preferred embodiment of the invention. As shown, processor housing 102 houses a user interface 110, scanning unit 112, and processing unit 114. Note that although the user interface, scanning unit and processing unit are all shown to be housed within processor housing 102, in general they may be provided separately or in other combinations. In general, processing unit 114 comprises a computer-based system for the detection of anatomical abnormalities. However, processing unit 114 may in general be the processor of almost any CAD system. For example, the present invention is applicable to and could be adapted to facilitate the input of film-based images into any of the CAD systems mentioned and incorporated by reference above.

User interface 110 comprises an X-ray film feeding mechanism 116 which handles and feeds the films in serial fashion to scanning unit 112. Film feeding mechanism 116 comprises a plurality of labeled film slots 120, each of which hold an individual x-ray film. According to a preferred embodiment of the invention, film feeding mechanism 116 should be designed so as to accommodate at least as many films as ordinarily used for a particular application. For example, in the United States, it is common for mammography x-ray films to come in sets of four. Each breast is usually imaged twice: the first image being a top view ordinarily called the craniocaudal view ("CC"), and the second image being a lateral view ordinarily called the mediolateral oblique view ("MLO"). According to a preferred embodiment, however, six film slots 120 are provided to accommodate the views commonly used in the United States leaving space for two additional films. The requirements for applications may vary, and film feeding mechanism 116 should be designed accordingly. For example, in Europe, it is common for a case to only include one image per breast, namely the mediolateral oblique view. Thus, film feeding mechanism 116 only needs to accommodate sets of two x-ray films. Additionally, the film feeding mechanism may comprise a stack film feeder for batch operation, which will be described in further detail below.

Film slots 120 should be labeled so as to aid the operator in placing each x-ray film in the appropriate film slot. For example, in a preferred embodiment, four of the six slots are labeled "RCC", "LCC", "RMLO", and "LMLO" for right craniocaudal, left craniocaudal, right mediolateral oblique, and left mediolateral oblique respectively. For other applications, film slots 120 should be labeled accordingly.

Additionally, film feeding mechanism 116 should be designed so as to accommodate the size of films ordinarily used in a particular application. For example, in a preferred embodiment, film slots 120 are designed to hold either 18 cm×24 cm, or 24 cm×30 cm films. This is preferably accomplished by providing a film feeding mechanism with a throat that is 24 cm wide to accommodate both film sizes, in which case the 18 cm×24 cm films are rotated in software using standard digital image rotation techniques.

Film feeding mechanism 116 also comprises film feed reset lever 130, which is used by the operator to reset the film slots 120 to receive the next batch of x-ray films. Eject button 132 is provided to allow the operator to abort the feeding or scanning process by ejecting the x-ray films contained in the transport mechanism or the scanning unit. Additionally, power light 134 and scan light 132 are provided to indicate to an operator that the processor housing has power, and that scanning is in process, respectively.

Finally, a bar code reader 138 provides a simple and efficient method of entering x-ray film information into the system. In a preferred embodiment, a "case" is the set of x-ray films obtained from a single patient, and ordinarily consists of four films. Note that some patients have only one breast, or in some cases either the "CC" view or the "MLO" view is missing, so the actual number of x-ray films per case may vary. According to a preferred embodiment, a Case ID number is assigned to each case to uniquely identify it. A bar coded Case ID is then affixed to the envelope containing the x-ray films for the case, or to another suitable location.

According to another embodiment of the invention, identification numbers are assigned to each individual x-ray film. Each film has its own bar code label identifying that film. According this embodiment, a bar code reader 138' could be mounted in film feeding mechanism 116. Alternatively, scanning unit 112 could be adapted to read the bar code label from each film.

Transport mechanism 122 transports the films individually from film slots 120 to scanning unit 112. After the scanning unit 112 has completed scanning a film, the film is ejected to an output film holder (not shown), and transport mechanism 122 feeds the next film to scanning unit 112. According to a preferred embodiment, film feeding mechanism 116 and transport mechanism 122 comprises a commonly available film feeding unit such as those commercially available from Lumisys, Inc.

Scanning unit 112 generates from each x-ray film a two-dimensional mammographic image. Preferably, scanning unit 112 should be a laser film digitizer and should have a dynamic range and spatial resolution comparable to those of the original mammographic film which typically has a dynamic range of 10,000:1 and spatial resolution of approximately 50 microns per pixel.

Figure 3:
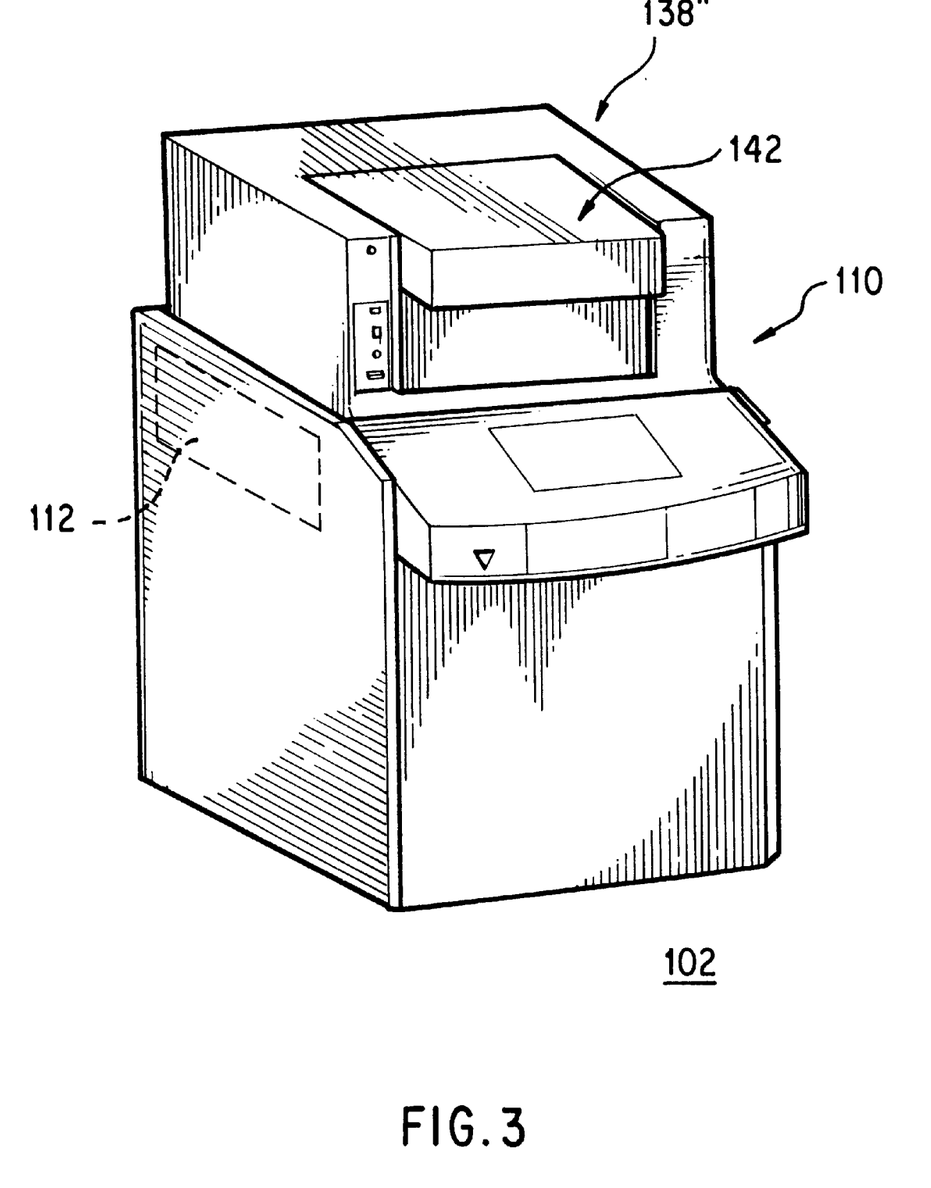
FIG. 3 illustrates an example of a processor housing for a computer-aided diagnostic system, according to an alternative preferred embodiment of the invention.

According to another preferred embodiment, film feeding mechanism 116 comprises a stack film feeder instead of film slots 120. Shown in FIG. 3 is an example of a processor housing having a stack film feeder 142. Advantageously, stack film feeder 142 provides the capability to feed relatively large numbers of films. Stack film feeder 142 is either of the first-in-first-out type ("FIFO") or last-in-first-out type ("LIFO"). Stack film feeder 142 individually feeds films to scanning unit 112 as required during processing. Suitable stack film feeders are currently or will soon be commercially available from vendors such as Lumisys, Inc. Note that in embodiments where each film has its own bar code label, bar code reader 138" is provided in stack film feeder 142. According to another preferred embodiment, a graphical or electromechanical user interface implemented motorized viewer 104 or wet read viewer 106 controls the organization of images processed en masse.

Although film feeding mechanism 116 and scanning unit 112 are described herein according to certain preferred embodiments, in general many alternative types of feeding mechanisms and scanners may be used, depending on the particular application. For example, suitable scanners are commercially available from a number of vendors including Konica and Abe Sekkei.

Figure 4:
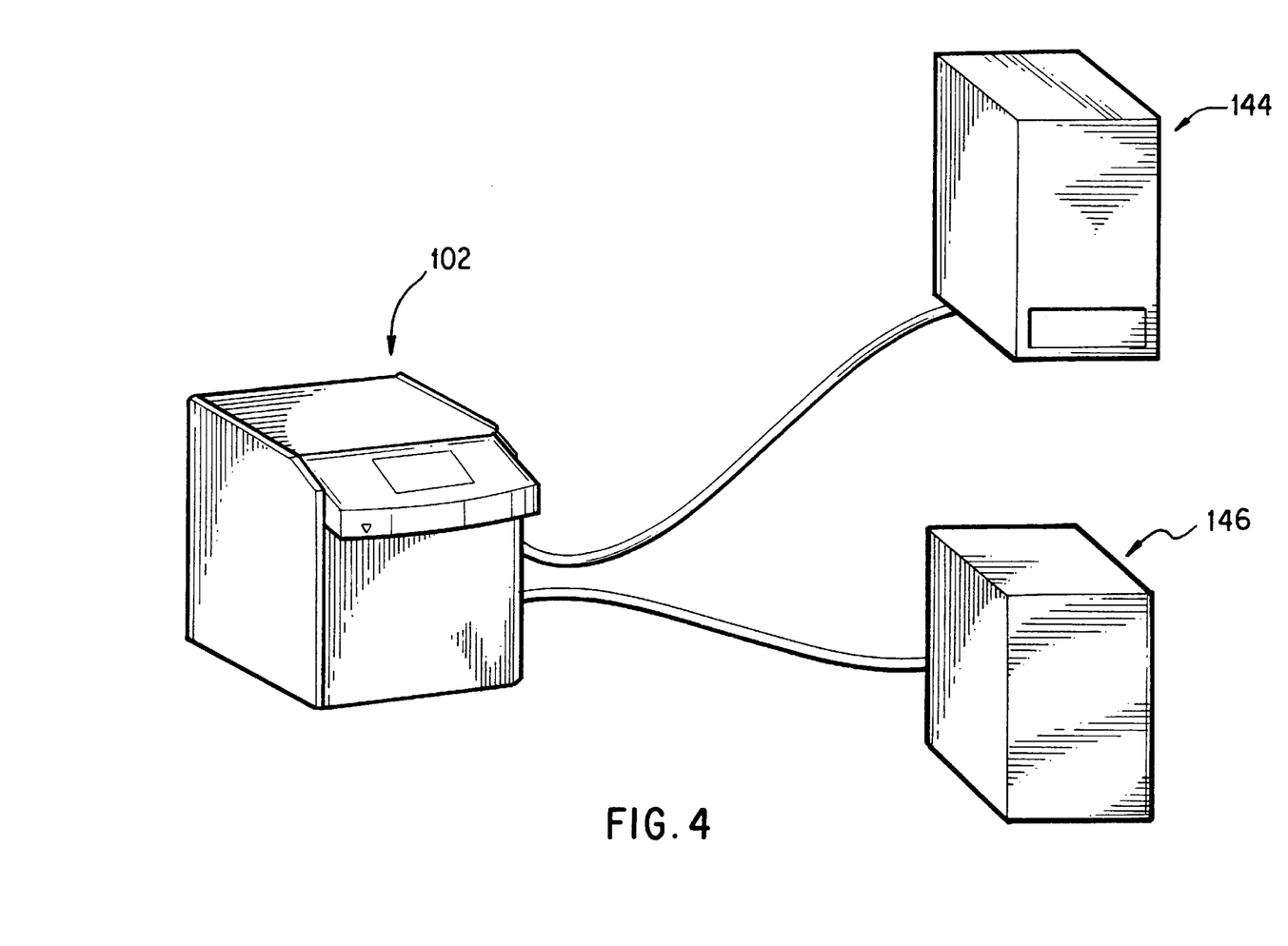
FIG. 4 illustrates an example of a processor housing connected to sources of digital image data, according to the invention.

Additionally, certain medical images may already be in digital format, such as images that were acquired with a digital medical imaging system, or that are stored in a digital image storage system. According to the invention, an example of a computer-aided diagnosis system which receives images already in digital format is shown in FIG. 4. Although processor housing 102 is shown connected to both digital image storage system 144 and digital medical imaging system 146, in general only one source of digital image data is needed. A wide variety of digital medical imaging systems currently exist. Some examples are: computer tomography systems, digital ultrasound imaging systems, scintillation camera systems, digital stimulated emission phosphor plate radiography systems, nuclear magnetic imaging systems, and digital mammographic systems. An example of a digital image storage system is disclosed in U.S. Pat. No. 5,416,602 to Inga et al., entitled "Medical Image System With Progressive Resolution" incorporated herein by reference. In the case where medical images are already in digital format, the feeding and scanning functions of the system are not needed. In such cases, the operator monitors the digital data being received by the system using the display panel, and is able to re-orient or change the order of images electronically, as will be described in greater detail below.

According to a preferred embodiment, touch sensitive display panel 118 is provided for interacting with the operator. The touch sensitive display panel 118 advantageously allows for, in a user-friendly fashion, prompting of the operator, displaying to the operator important functions of the system, and inputting various types of information by the operator using a stylus or finger and without the use of an additional keyboard. A color liquid crystal display, such as a VGA compatible, of suitable size is preferably used. For example, a 10.3 inch thin-film-transistor LCD panel such as those manufactured by Sharp may be used. To provide touch screen capability, a touch-sensitive panel from Elo Touchsystems is overlaid on the LCD display. The touch-sensitive panel may be of any type built on a clear substrate that gives a sufficient resolution of X–Y coordinates or values translatable to X–Y coordinates (e.g. R and $\Theta$ values) to the computer to allow one displayed icon to be distinguished from another. Several touch-sensitive panel technologies embody the required specifications including deflection-contact and capacitive-contact type panels. Commercially available touch-sensitive screens are available which connect to PC-based microcomputers via a RS-232 port or the like.

Figure 5:
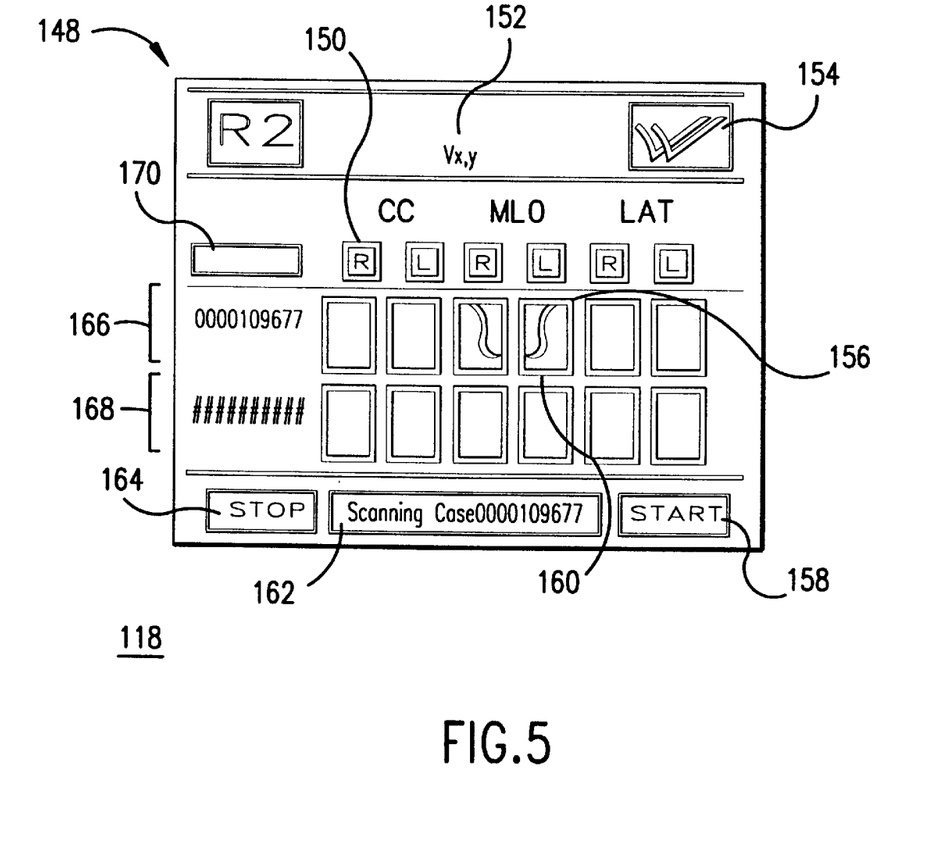
FIG. 5 illustrates an example of a touch sensitive display panel, according to the invention.

Referring now to FIG. 5, display panel 118 is described in greater detail, according to a preferred embodiment of the invention. Display panel 118 is capable of displaying a number of different screens, depending on the particular application. Shown in FIG. 5 is control panel screen 148, which provides convenient operator controls and advantageously displays the status during different steps of processing. Menu button 154 is provided to allow the operator to select screen 148 or other screens which will be described herein. Case ID window 170 is provided to display to the operator the Case ID number which has been entered using the bar code reader 138 (shown in FIG. 2).

View selection buttons 150 are provided to allow the operator to select which x-ray images will be processed for a particular case. As described above, a single mammography case in the United States ordinarily consists of four films, namely craniocaudal and mediolateral oblique views for both right and left breasts. As shown in FIG. 5, a separate view button 150 corresponds to each one of these common views. Under "CC" are separate buttons "R" and "L" for right and left breasts respectively. Likewise, under "MLO" are separate "R" and "L" buttons. The system is preferably designed to accommodate additional views. For example, as shown in FIG. 5 the display panel includes view buttons 150 for lateral views labeled as "LAT". View buttons 150 are preferably designed as toggle switches, such that pressing the button alternately selects and de-selects the scanning of that view. The operator therefore simply and conveniently selects or de-selects views according to the particular case to be processed. For example, if a patient only has one breast due a prior mastectomy, then the operator selects only the views of the one breast using view buttons 150, so that the film feeding, scanning and analysis takes place appropriately. Likewise, if the system is used in European countries or other areas where cases only consist of one view of each breast, such as the "MLO" view, then the operator selects only those views to be processed. A preferred embodiment allows a default position for each separate view button 150 to by a system administrator or service technician.

Start button 158 is provided so that the operator may conveniently begin the scanning and analysis process. Similarly, stop button 164 allows the operator to prematurely stop the processing of the current case. Additionally, software release label 152 conveniently indicates the version of software currently running on the system.

Status window 162 is provided to verbally indicate the processing status. For example, if the system is ready for a new case to be scanned, the words "Ready To Scan" or the like appear in status window 162. When a case is being processed, as is the case in FIG. 5, status window 162 reads "Scanning Case", and indicates the appropriate case number.

As shown in FIG. 5, the case being currently processed is shown in the current case area 166. Current case area 166 displays the case number on the left side of the area, and in the remaining area, graphically displays the status of the processing of the case. As shown, directly beneath each view button 150 is a miniature image window 160 which displays a very small version of the mammogram once a film has been scanned. The miniature image windows 160 advantageously provide the operator with visual real-time confirmation that each film has been scanned correctly. For example, if the right and left breast films are inadvertently switched when loaded into the film slots, the operator should recognize the error as soon as the films are scanned, since the miniature images will not correctly correspond to the correct positions in current case area 166. Similarly, if a film is rotated by 90 or 180 degrees from the proper orientation, the operator should be able to notice this as soon as the miniature images are displayed. Early identification of errors such as the wrong order or the wrong orientation is highly beneficial in the processing of mammograms, since the operator can abort the processing of that case and re-load the films in the correct order and orientation. This saves not only the time and expense of needlessly processing incorrectly loaded films, but, moreover, significantly decreases the likelihood of wasting the radiologist's time due to viewing such films. Importantly, it has been found that early feedback to the operator has the unexpected advantage of training the operator to correctly load the films.

According to another preferred embodiment, when the operator identifies an error in orientation or order, the operator can simply correct the problem electronically, rather than having to re-load and re-scan the films. According to this embodiment, the orientation of a film image is changed simply and conveniently by pressing the miniature image window 160. A particular film may be rotated at 90 degree increments, and may be flipped front-to-back. Thus, a particular film is orientable in up to eight different positions. Each time image window 160 is pressed, the image will move to a different one of the eight possible orientations. Since an image displayed in miniature image window 160 has already been scanned into digital format, standard digital image rotation techniques are used in processing unit 114 to map the image file into the desired new orientation. Similarly, if the operator detects that a particular image is in the wrong miniature image window 160, which may be due to loading the films in the wrong film slots 120, the operator switches the positions of any two miniature images. The operator presses and holds down the miniature image identified as being in the incorrect position and drags the miniature image to the correct slot before releasing it. According to a preferred embodiment, if the miniature image is released into an empty position the miniature image remains there. If the miniature image is released into an occupied position, all the miniature images between the vacated position and the release position including the image previously occupying the release position, are shifted one position in the direction of the vacated location. Thus, the operator can simply and easily correct problems in film order and orientation, advantageously without spending the time and effort in re-loading and re-scanning films.

In another preferred embodiment in which batch processing of images occurs, no operator is present to re-orient images at the processor. Instead, operator controls are provided at the motorized viewer 104 or wet read viewer 106 that allow grouping of images into cases and re-orienting of films placed incorrectly into bulk feeder.

An additional unexpected advantage of the invention's image reorientation feature is the ability to display imagery in the mirror image fashion preferred by a small percentage of physicians.

Additionally, a color coded border 156 is provided around each miniature image window 160 to indicate to the operator the current status of each film in the current case being processed. According to one implementation, yellow indicates that the film is being scanned or is waiting to be analyzed by the processing unit; blue indicates that the film is being analyzed; green indicates that the analysis on the film has finished and the image is ready for viewing; and red indicates that either an error occurred in the processing, or the processing was prematurely stopped by the operator. In this way, color coding of the borders beneficially allows the operator to simply and conveniently monitor the status of all the films being processed. Providing feedback to the operator throughout the processing of the case advantageously allows for the efficient use of the whole system, and allows the operator to detect and correct errors prior to sending the images to the radiologist.

As shown in FIG. 5, according to a preferred embodiment, a previous case area 164 is provided to display the status and Case ID number of the case processed just prior to the current case. In this way, additional assistance is provided by shifting all of the miniature image windows 160 and borders 156 down to the previous case area 164 as soon as processing for the next case begins.

The operation of the user interface 110 will now be described in greater detail, according to a preferred embodiment, referring to FIGS. 2–5. The power to the processor housing 102 is switched on using power switch 140. The operator then waits for the message "Ready to Scan" to appear in status window 162. During the waiting period, the scanning unit may be warming up and various system diagnostics may be taking place. Messages such as "Scanner Warming Up" or "Self-Diagnostics In Progress" are displayed in status window 162 to conveniently indicate such processes to the operator.

Once the "Ready to Scan" message appears in status window 162, the system is ready to scan films. It is recommended that quality assurance procedures be performed at regular intervals, such as once per day. Thus, the operator may at this point wish to scan test films, as will be described in greater detail below.

After scanning the test films and testing the scanner, if necessary, the system is ready to scan patient films. The operator first depresses reset lever 130, to reset the film feeding mechanism 110. Next, the operator loads each x-ray film for a particular case in the appropriate film slot 120. Importantly, the operator should pay careful attention to loading films in the correct order and correct orientation.

After the films have been loaded in films slots 120, the operator scans the bar code label using bar code reader 138, identifying the Case ID to the system. Preferably a beep will sound when the bar code has been properly read, and the Case ID number will appear in the case ID window 170, advantageously providing feedback to the operator. The operator then selects which views are to be scanned using view selections buttons 150 to de-select any views which do not exist for that case. The system is preferably preset to scan both right and left breast views for craniocaudal ("CC") and mediolateral oblique ("MLO") views. Thus, in practice the operator should only have to select or de-select certain views if the current case differs from the default settings. For example, if the case has only the CC and MLO views for the right breast, the operator should de-select the left-breast CC and MLO views, so the system knows that only the right-breast views will be scanned. In another example, a system used in Europe is preset to scan only MLO views, but for some reason, a case also includes CC views. In that case, the operator should select the CC views to ensure those views are scanned. After selecting or de-selecting any views, the operator should press the start button 158, which begins the film feeding and scanning process. As the films are being fed and scanned, as described above, the operator monitors the progress of the case by viewing the miniature image windows 160 and color coded borders 156. As the processing for each film is completed, the color-coded border 156 for that film image is displayed in green. As soon as processing for all of the films is completed and all the borders are green, the words "Ready to Scan" appear in status window 162. The operator then enters the next case of films. As noted, miniature image windows 160 and color coded borders 156 advantageously provide early feedback to the operator, thereby providing the unexpected advantage of training the operator to correctly load the films.

At any point in the process the operator may discontinue processing on the current case by pressing the stop button 164. When the stop button is pressed, the system ejects the current film from the scanning unit and any films remaining in the film slots can be rapidly removed manually. Possible reasons for stopping the case include: incorrect positioning of the films, not all the films dropping down from the film slots 120 to the transport mechanism 122, or the case having already been processed.

Figure 6A:
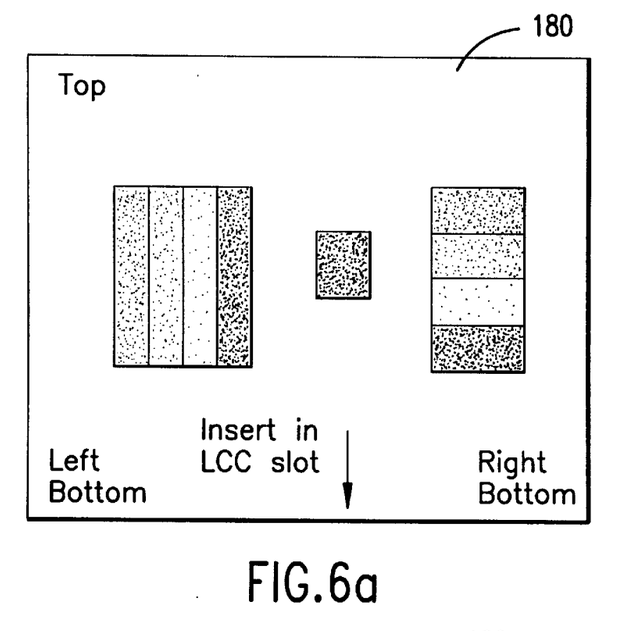
FIGS. 6a and 6b illustrate examples of test films, according to the invention.
Figure 6B:
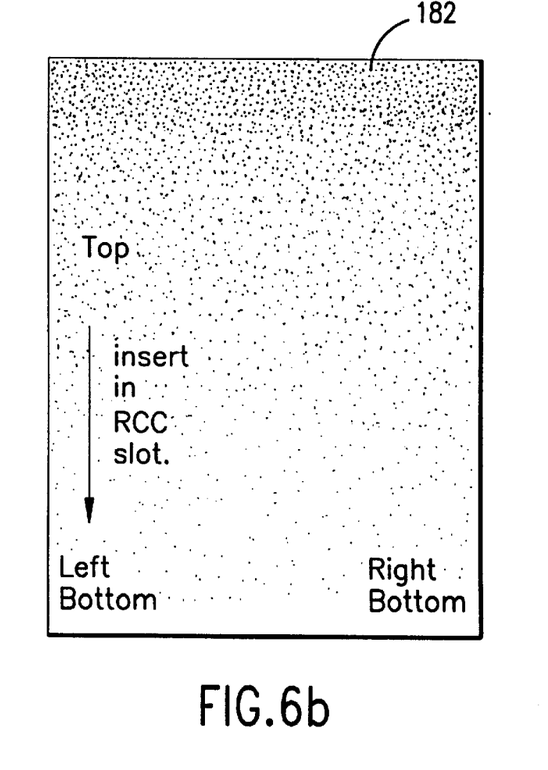
Figure 7:
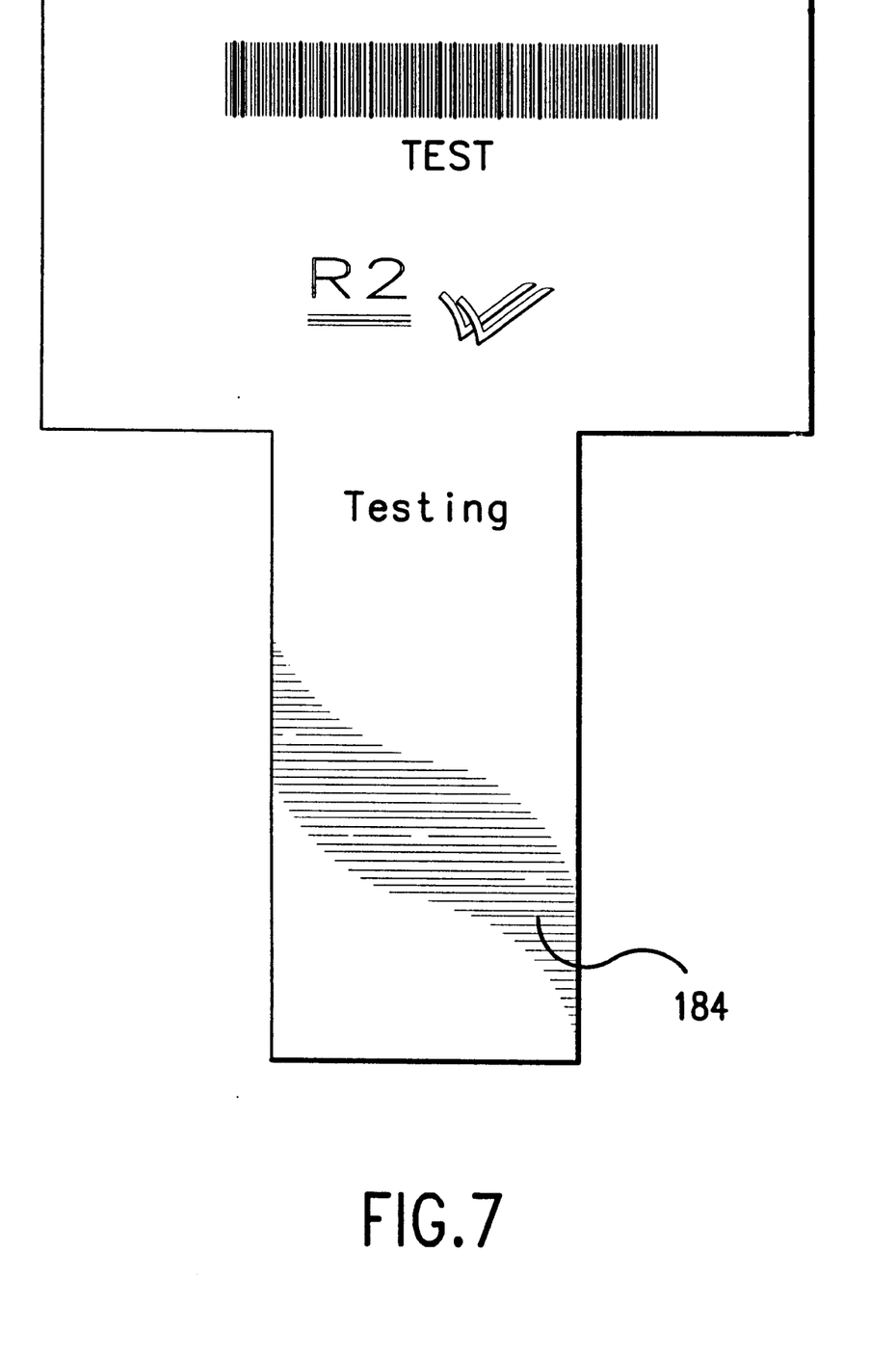
FIG. 7 is an example of a bar code test paddle, according to the invention.

Referring now to FIGS. 6a, 6b and 7, the quality assurance and self-test features will now be described, according to a preferred embodiment of the invention. Although scanning unit 112 (shown on FIG. 2) may be of a type that is self-calibrating, it is nonetheless advantageous to provide simple and convenient quality assurance procedures to help insure the scanning unit's resolution and gray scale sensitivity are within acceptable levels. Test films, such as test films 180 and 182 shown in FIGS. 6a and 6b, should be used to calibrate the scanning unit. A bar code indicating to the system that maintenance procedures are to be performed is preferably provided, such as shown in FIG. 7. Bar code paddle 184 contains a special bar code used for scanning of test films.

According to a preferred embodiment, the following quality assurance procedure is used to test the scanning unit. Film feeder reset lever 130 is pressed to reset the film feeding mechanism. Test films 180 and 182 are loaded into film slots 120 labelled "LCC" and "RCC" respectively. Bar code paddle 184 is now scanned by the bar code reader 138. A case ID number indicating the test, such as "9999999901", should appear in case ID window 170. Start button 158 is now pressed to begin the processing of the test films. While the test films are being scanned, the operator monitors the progress of the test procedure by viewing the color coded borders 156 and miniature image windows 160. A successful test is indicated by a green-colored border or a message such as "Passed Test!" displayed in status window 162. A red border in color coded border 156 or a message such as "Failed test" is used to indicate test failure and that the operator should refer to troubleshooting procedures.

Figure 8:
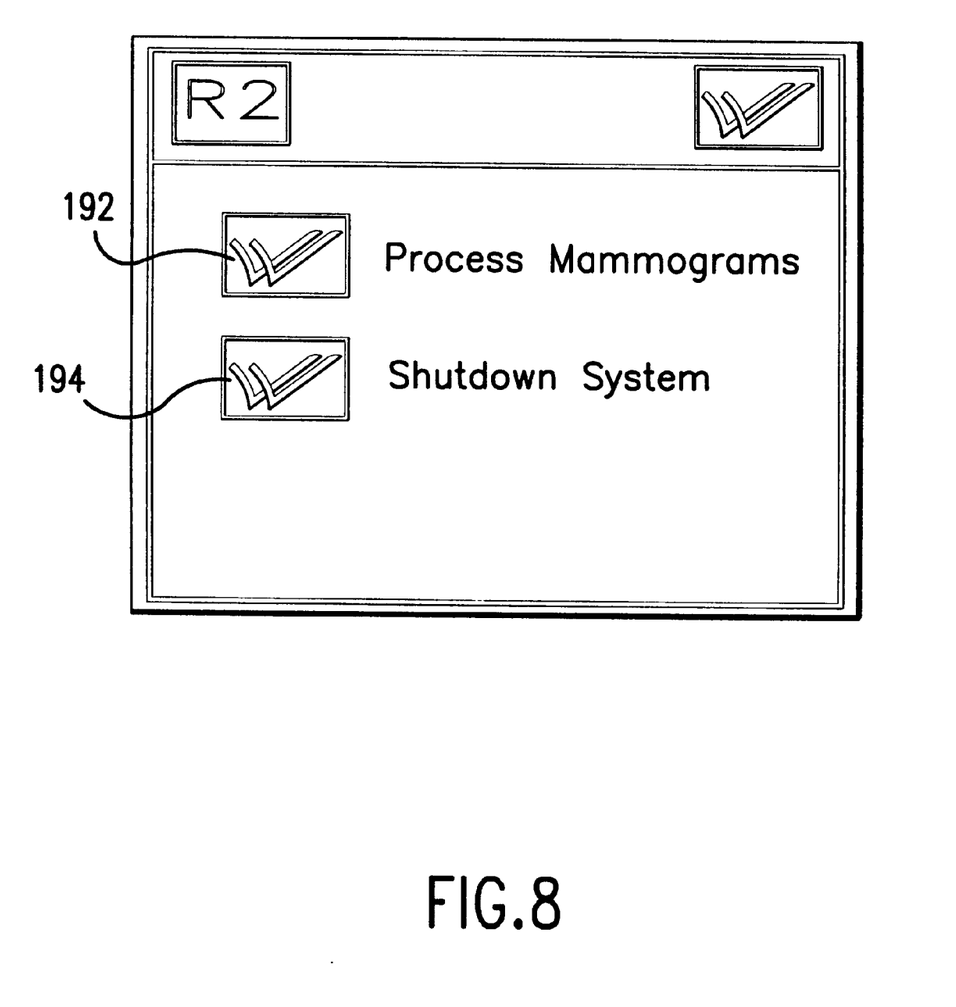
FIG. 8 illustrates an examples of a menu screen, according to the invention.

According to a preferred embodiment, a procedure is also provided to safely shut down the system. As shown in FIG. 8, menu 190 is provided on display panel 118 which gives the operator choices of different procedures. Menu 190 is reached by pressing menu button 154, (shown in FIG. 5). Menu 190 preferably contains buttons for different options, such as a "Processing Mammograms" button 192, and a "Shut Down System" button 194. In order to shut down the system, the operator presses button 194. In response a warning message on the display panel such as "Do You Really Want to Shut Down the System?" is displayed. If the operator confirms the shut down, the system performs shut down procedures, after which a message such as "OK To Switch Off Power" is displayed on display panel 118.

While preferred embodiments of the invention have been described, the descriptions are merely illustrative and are not intended to limit the present invention. For example, although the embodiments of the invention described above were in the context of a system for computer-aided diagnosis and detection of breast carcinoma in x-ray films, those skilled in the art will recognize that the disclosed methods and structures are readily adaptable to broader application. For example, the invention is applicable to many other types of CAD systems for detecting other types of anatomical abnormalities, including but not limited to chest x-ray, magnetic resonance imaging, and nuclear medicine.

We claim:

1. A user interface for facilitating input of data from film based medical images into a computer-aided diagnosis system for detecting anatomical abnormalities in the film based medical images, the user interface comprising:

a scanner adapted to receive and scan the film-based medical images and generate therefrom digital image data, the digital image data representing the medical images and characterized by high spatial resolution, said scanner communicating with the computer-aided diagnosis system and adapted to transmit the digital image data to the computer-aided diagnosis system for analysis by the computer-aided diagnosis system;

a feeder mechanically connected to said scanner, adapted to hold at least one film-based medical image, and configured to mechanically transport the film-based medical image to said scanner;

a display in communication with the computer-aided diagnosis system and said scanner, said display adapted and configured to display status information to a user who loads film-based medical images into said feeder and monitors input of the data into the computer-aided diagnosis system, wherein upon completion of scanning of a first film-based medical image the status information is displayed to the user such that the user can detect errors in loading the first film-based medical image into said feeder and such that the user can take any necessary corrective action; and a user input system in communication with the computer-aided diagnosis system and said scanner, said user input system adapted and configured to receive input information from the user.

2. The user interface of claim 1 wherein
said feeder is adapted to hold at least two film-based medical images, and configured to mechanically transport the film-based medical images to said scanner.

3. The user interface of claim 2 wherein said feeder comprises at least two holding slots, each holding slot dimensioned to hold one film-based medical image, and said errors in loading includes loading a film based medical image in an incorrect holding slot.

4. The user interface of claim 3 wherein the input information comprises information indicating to the computer-aided diagnosis system to organize the digital image data so as to compensate for errors in loading of film-based medical images in an incorrect holding slot.

5. The user interface of claim 2 wherein said feeder comprises a stack feeder dimensioned to hold a plurality of film-based medical images and adapted to individually feed the film-based medical images to said scanner.

6. The user interface of claim 5 wherein the errors in loading include loading at least one of the plurality of film-based medical images in an incorrect order.

7. The user interface of claim 6 wherein the input information comprises information indicating to the computer-aided diagnosis system to organize the digital image data so as to compensate for errors in the loading of film-based medical images.

8. The user interface of claim 1 wherein said display comprises a display screen, said user input system comprises a touch-sensitive panel overlaying the display screen.

9. The user interface of claim 8 wherein the input information comprises view selection information indicating the type of view for each film-based medical image loaded into said feeder.

10. The user interface of claim 8 wherein said user input system comprises a bar code reader adapted to scan bar coded information identifying at least one of the film-based medical images.

11. The user interface of claim 8 wherein the input information comprises information indicating that the user will be conducting testing procedures.

12. The user interface of claim 1 wherein the errors in loading include errors in orientation of the first film-based medical image.

13. The user interface of claim 12 wherein the input information comprises information from the user indicating to the computer-aided diagnosis system to organize the digital image data so as to compensate for errors in orientation.

14. The user interface of claim 12 wherein said status information comprises at least one display image, each of the at least one display images displaying features of one film-based medical image such that errors in loading can be detected by the user.

15. The user interface of claim 14 wherein said status information further comprises a color-coded border surrounding each of the at least one display images, the color-coded border indicating to the user the current processing status of the one film-based medical image.

16. The user interface of claim 1 wherein said user interface is in communication with a digital medical imaging system.

17. The user interface of claim 16 wherein the status information indicates to the user that the digital image data represents a medical image which does not correspond to a predetermined expected image, and wherein the input information comprises information indicating to the computer-aided diagnosis system to organize the digital image data so as to re-position the medical image.

18. The user interface of claim 1 wherein said user interface is in communication with a digital image storage system.

19. The user interface of claim 18 wherein the status information indicates to the user that the digital image data represents a medical image which does not correspond to a predetermined expected image, and wherein the input information comprises information indicating to the computer-aided diagnosis system to organize the digital image data so as to re-position the medical image.

20. A user interface for facilitating input of film-based medical images into a computer-aided diagnosis system for detecting anatomical abnormalities in the film-based medical images, the user interface comprising:
a scanner adapted to receive and individually scan the film-based medical images and generate therefrom digital image data which can be analyzed by the computer-aided diagnosis system;
a film feeder mechanically connected to said scanner, adapted to hold at least two film-based medical images, and configured to mechanically transport the film-based medical images individually to said scanner;
a display screen in communication with the computer-aided diagnosis system and said scanner;
at least one miniature image displayed on said display screen, adapted to display upon completion of scanning of a first film-based medical image to a user who loads the film-based medical images in said film feeder features of the first film-based medical image such that the user can detect errors in loading the first film-based medical image into said feeder and such that the user can take any necessary corrective action; and
a touch-sensitive panel overlaying said display screen in communication with the computer-aided diagnosis system and said scanner, the touch-sensitive panel positioned and configured to receive input information from a user.

21. The user interface of claim 20 wherein said film feeder comprises at least two holding slots, each holding slot dimensioned to hold one film-based medical image.

22. The user interface of claim 20 wherein said film feeder comprises a stack film feeder dimensioned to hold a plurality of film-based medical images and adapted to individually feed the film-based medical images to said scanner.

23. The user interface of claim 20 wherein the input information comprises information indicating to the computer-aided diagnosis system to organize the digital image data so as to compensate for errors in the loading of film-based medical images.

24. A method of facilitating input of data from film based medical images into a computer-aided diagnosis system for detecting anatomical abnormalities in the film based medical images, the method comprising the steps of:
mechanically holding at least one film-based medical image to be analyzed by the computer-aided diagnosis system:
mechanically feeding the film-based medical image to a scanner;
scanning the film-based medical images and generating therefrom digital image data, the digital image data representing the medical images and being characterized by high spacial resolution;
communicating the digital image data to the computer-aided diagnosis system for analysis by the computer-aided diagnosis system;
graphically displaying status information upon completion of said scanning step to a user who loads film-based medical images and monitors said steps of receiving and communicating, such that the user can detect errors in loading the first film-based medical image into said feeder and such that the user can take any necessary corrective action; and receiving input information from the user.

25. The method of claim 24 wherein said step of mechanically holding comprises holding at least two film-based medical images to be analyzed by the computer-aided diagnosis system.

26. The method of claim 25 wherein said step of holding comprises providing least two holding slots, each holding slot dimensioned to hold one film-based medical image, and wherein said step of graphically displaying further comprises indicating to the user upon completion of scanning that at least one film-based medical image had been loaded in an incorrect holding slot.

27. The method of claim 26 wherein said step of receiving input comprises receiving instructions from the user to organize the digital image data so as to compensate for errors in the loading of the film-based images.

28. The method of claim 25 wherein said step of mechanically holding comprises providing a stack feeder dimensioned to hold a plurality of film-based medical images and adapted to individually feed the film-based medical images to the computer-aided diagnosis system.

29. The method of claim 25 wherein said step of graphically displaying comprises displaying on a display screen, and said step of receiving input information comprises receiving input information through a touch-sensitive panel overlaying the display screen.

30. The method of claim 24 wherein said step of graphically displaying further comprises displaying on a display screen at least one display image having features of one film-based medical image such that an error in loading the same is indicated to the user.

31. The method of claim 30 wherein said step of graphically displaying further comprises displaying on the display screen a color-coded border surrounding each of the at least one display images, the color-coded border indicating to the user the current processing status of the one film-based medical image.

32. The method of claim 24 further comprising the step of receiving digital image data from a digital medical imaging system.

33. The method of claim 32 wherein the status information indicates to the user that the digital image data represents a medical image which does not correspond to a predetermined expected image, and wherein the input information comprises information indicating to the computer-aided diagnosis system to organize the digital image data so as to re-position the medical image.

* * * * *